US009490961B2

(12) United States Patent
Ahn et al.

(10) Patent No.: US 9,490,961 B2
(45) Date of Patent: *Nov. 8, 2016

(54) METHOD OF SIGNALING CONTROL INFORMATION IN WIRELESS COMMUNICATION SYSTEM WITH MULTIPLE FREQUENCY BLOCKS

(71) Applicant: LG ELECTRONICS INC., Seoul (KR)

(72) Inventors: Joon Kui Ahn, Anyang-si (KR); Jung Hoon Lee, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,784

(22) Filed: Nov. 4, 2015

(65) Prior Publication Data

US 2016/0057774 A1 Feb. 25, 2016

Related U.S. Application Data

(63) Continuation of application No. 14/150,497, filed on Jan. 8, 2014, now Pat. No. 9,281,933, which is a
(Continued)

(30) Foreign Application Priority Data

Jul. 10, 2009 (KR) .................. 10-2009-0062962

(51) Int. Cl.
*H04W 72/12* (2009.01)
*H04L 5/06* (2006.01)
(Continued)

(52) U.S. Cl.
CPC .............. *H04L 5/06* (2013.01); *H04L 1/1812* (2013.01); *H04L 5/001* (2013.01); *H04L 5/0094* (2013.01);
(Continued)

(58) Field of Classification Search
CPC ... H04L 5/0007; H04L 5/001; H04L 5/0053; H04L 5/0094; H04L 5/06; H04L 4/005; H04L 1/18; H04L 1/08; H04L 1/1858; H04W 28/00; H04W 72/00; H04W 72/44; H04W 72/0453; H04W 72/1263
USPC ............. 370/276–277, 281, 293, 295, 310.2, 370/326, 329–330, 328, 341, 343, 345, 431, 370/436–437, 442, 480–482; 714/748–750; 455/403, 422.1, 447, 450–454

See application file for complete search history.

(56) References Cited

U.S. PATENT DOCUMENTS 8,625,504 B2 1/2014 Hamaguchi et al.
8,908,632 B2 * 12/2014 Pi ........................... H03M 13/27
370/329
(Continued)

FOREIGN PATENT DOCUMENTS

EP 1944896 A1 7/2008
WO WO 2006/125203 A1 11/2006

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall . . . ," 3GPP TS 36.300 V8.5.0, May 1, 2008, pp. 1-134, XP050377580.
(Continued)

*Primary Examiner* — Mohamed Kamara
(74) *Attorney, Agent, or Firm* — Birch, Stewart, Kolasch & Birch, LLP

(57) ABSTRACT

A method of receiving a downlink signal by a user equipment in a wireless communication system; the user equipment therefore; a method of transmitting a downlink signal by a base station in a wireless communication system; and the base station therefore are discussed. The method of receiving a downlink signal by a user equipment in a wireless communication system according to one embodiment includes receiving downlink scheduling information, the downlink scheduling information including a frequency block indicator and resource allocation information for one or more transport blocks (TBs); and receiving the downlink signal including the one or more TBs via a first frequency block among multiple frequency blocks. The first frequency block is indicated by the frequency block indicator among the multiple frequency blocks. Each of the multiple frequency blocks does not overlap with other multiple frequency blocks, and has a respective hybrid automatic repeat request (HARQ) process.

20 Claims, 22 Drawing Sheets

Related U.S. Application Data continuation of application No. 12/990,736, filed as application No. PCT/KR2009/004323 on Aug. 3, 2009, now Pat. No. 8,644,245.

(60) Provisional application No. 61/087,736, filed on Aug. 11, 2008, provisional application No. 61/087,734, filed on Aug. 11, 2008.

(51) Int. Cl.
*H04L 1/18* (2006.01)
*H04W 72/04* (2009.01)
*H04L 5/00* (2006.01)

(52) U.S. Cl.
CPC ....... *H04W 72/044* (2013.01); *H04W 72/1273* (2013.01); *H04W 72/1289* (2013.01); *H04L 5/0007* (2013.01); *H04L 5/0053* (2013.01)

(56) References Cited

U.S. PATENT DOCUMENTS

| | | |
|---|---|---|
| 2001/0016493 A1 | 8/2001 | Kim et al. |
| 2006/0072649 A1 | 4/2006 | Chang et al. |
| 2006/0120470 A1 | 6/2006 | Hwang et al. |
| 2007/0058595 A1 | 3/2007 | Classon et al. |
| 2008/0084853 A1 | 4/2008 | Kuchibhotla et al. |
| 2008/0225786 A1 | 9/2008 | Han et al. |
| 2008/0310389 A1* | 12/2008 | Suzuki ............ H04L 1/1858 370/346 |
| 2009/0109905 A1 | 4/2009 | Ahmadi |
| 2009/0197542 A1 | 8/2009 | Buckley et al. |

OTHER PUBLICATIONS

3GPP, "3rd Generation Partnership Project; Technical Specification Group Radio Access Network; Evolved Universal Terrestrial Radio Access (E-UTRA); Physical layer procedures (Release 8)", 3GPP TS 36.213, V8.3.0, May 2008, 46 pages.

Berkmann et al., "On 3G LTE Terminal Implementation—Standard, Algorithms, Complexities and Challenges," Wireless Communications and Mobile Computing Conference, Aug. 6-8, 2008, pp. 970-975.

* cited by examiner (a) 1 or 2 TX case (b) 4 TX case (a) Transmitter (b) Receiver (a) Transmitter (b) Receiver (a) Transmitter (b) Receiver (N can be replaced by M)

(N can be replaced by M)

(N can be replaced by M)

METHOD OF SIGNALING CONTROL INFORMATION IN WIRELESS COMMUNICATION SYSTEM WITH MULTIPLE FREQUENCY BLOCKS

CROSS-REFERENCE TO RELATED APPLICATIONS

This application is a Continuation of co-pending U.S. application Ser. No. 14/150,497 filed on Jan. 8, 2014, which is a Continuation of U.S. application Ser. No. 12/990,736 filed on Nov. 2, 2010 (now U.S. Pat. No. 8,644,245 issued Feb. 4, 2014), which is the National Phase of PCT/KR2009/004323 filed on Aug. 3, 2009, which claims priority under 35 U.S.C. 119(e) to U.S. Provisional Application Nos. 61/087,736 and 61/087,734 filed on Aug. 11, 2008 and under 35 U.S.C. 119(a) to Patent Application No. 10-2009-0062962 filed in Korea on Jul. 10, 2009, all of which are hereby expressly incorporated by reference into the present application.

BACKGROUND OF THE INVENTION

Field of the Invention

The present invention relates to a wireless communication system that uses a plurality of frequency blocks. The wireless communication system can support at least one of single carrier-frequency division multiple access (SC-FDMA), multi carrier-frequency division multiple access (MC-FDMA), and orthogonal frequency division multiple access (OFDMA). The wireless communication system can also support at least one of frequency division duplex (FDD), half-FDD (H-FDD), and time division duplex (TDD). More particularly, the present invention relates to a method of signaling control information in the wireless communication system.

Description of Related Art

FIG. 1A illustrates a network structure of an Evolved Universal Mobile Telecommunications System (E-UMTS). The E-UMTS system is an evolved version of the conventional WCDMA UMTS system and standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1A, the E-UMTS includes a User Equipment (UE), a base station, and an Access Gateway (AG) which is located at an end of a network (E-UTRAN) and connected to an external network. Generally, the base station can simultaneously transmit multiple data streams for a broadcast service, a multicast service and/or a unicast service. The AG can be divided into a part that handles processing of user traffic and a part that handles control traffic. In this case, the AG part for processing new user traffic and the AG part for processing control traffic can communicate with each other using a new interface. One or more cells may exist for one eNode B (eNB). One cell constituting eNB is set to one of bandwidths of 1.25, 2.5, 5, 10, and 20 Mhz to provide a downlink or uplink transport service to several user equipments. Also, in a wireless communication system, one base station controls data transmission and reception for a plurality of user equipments. The base station transmits downlink scheduling information of downlink data to the corresponding user equipment to notify time and frequency domains to which data will be transmitted and information related to encoding scheme, data size, hybrid automatic repeat and request (HARQ). Also, the base station transmits uplink scheduling information of uplink data to the corresponding user equipment to notify time and frequency domains that can be used by the corresponding user equipment, and information related to encoding scheme, data size, HARQ. Different cell can be established to provide different bandwidths. An interface for transmitting user traffic or control traffic can be used between eNBs. A Core Network (CN) may include the AG and a network node or the like for user registration of the UE. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

FIG. 1B illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode B" or "eNB". The eNBs are connected with each other through an X2 interface. X2 user plane interface (X2-U) is defined between the eNBs. The X2-U interface provides non-guaranteed delivery of a user plane PDU. X2 control plane interface (X2-CP) is defined between two neighboring eNBs. The X2-CP performs context transfer between eNBs, control of a user plane tunnel between a source eNB and a target eNB, transfer of handover message, and uplink load management. The eNB is connected to the User Equipment (UE) through a radio interface and is connected to an Evolved Packet Core (EPC) through a S1 interface. S1 user plane interface (SI-U) is defined between the eNB and a serving gateway (S-GW). S1 control plane interface is defined between the eNB and a mobility management entity (MME). The S1 interface performs bearer service management of an evolved packet system (EPS), non-access stratum (NAS) signaling transport, network sharing, MME load balancing, etc.

SUMMARY OF THE INVENTION

Although wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advance" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. A bandwidth of each frequency block can be defined based on a bandwidth of a system block used in the LTE system.

In this respect, it is required to efficiently design a control channel in a communication system that supports a wideband. Moreover, since a user equipment of the existing LTE system and a user equipment of the LTE-A system coexist in the LTE-A system, it is preferably required to design a control channel considering both of the user equipments. Also, a method of configuring control information under a communication system that supports a wideband is required.

Accordingly, the present invention is directed to a method of signaling control information in a wireless communication system with multiple frequency blocks, which substantially obviates one or more problems due to limitations and disadvantages of the related art.

An object of the present invention is to provide a method of efficiently providing a control channel in a wideband communication system.

Another object of the present invention is to provide a method of efficiently providing a control channel in a wireless communication system that supports a plurality of frequency blocks.

Other object of the present invention is to provide a method of efficiently configuring control information in a wideband communication system.

It is to be understood that technical problems to be solved by the present invention are not limited to the aforementioned technical problems and other technical problems which are not mentioned will be apparent from the following description to the person with an ordinary skill in the art to which the present invention pertains.

In one aspect of the present invention, a method for performing communication in a user equipment of a wireless communication system comprises receiving a control region through a specific frequency block of a plurality of frequency blocks, the control region including a plurality of control channels; identifying a first control channel for the user equipment in the control region; and performing an operation in accordance with information included in the first control channel, wherein the specific frequency block through which the first control channel is transmitted is changed according to a certain pattern with the lapse of time.

In another aspect of the present invention, a user equipment for performing communication using a plurality of frequency blocks comprises a radio frequency (RF) module configured to transmit or receive a signal through the plurality of frequency blocks; and a processor configured to process the signal received from the RF module per frequency block, wherein the RF module receives a control region through a specific one of the plurality of frequency blocks, the control region including a plurality of control channels, the processor identifies a first control channel for the user equipment in the control region and performs an operation in accordance with information included in the first control channel, and the specific frequency block through which the control region is transmitted is changed according to a certain pattern with the lapse of time.

The wireless communication system supports carrier aggregation or bandwidth aggregation. In this case, a bandwidth of each frequency block is established independently. Also, a bandwidth of each frequency block is established based on a system bandwidth defined in a legacy system. For example, each frequency block has the same size as that of a system block defined in the legacy system. If the legacy system is 3GPP LTE system, a bandwidth of each frequency block has any one of 1.25, 2.5, 5, 10, 20 MHz, and their multiple numbers. Also, at least one of a plurality of frequency blocks, preferably one frequency block is used as a legacy system block that supports a legacy user equipment.

In this case, center carriers of the respective frequency blocks are established differently from one another.

The control region is configured by one or more consecutive orthogonal frequency division multiple access (OFDMA) symbols. For example, the control region is configured by one to three consecutive OFDM symbols.

The step of identifying the first control channel includes identifying a control channel search space established within the control region, the control channel search space being configured by some of all control channels.

The control channel search space includes one or more control channel elements (CCEs).

The information included in the first control channel includes scheduling information. In this case, data are transmitted and received through a scheduled one of the plurality of frequency blocks, and the specific frequency block is different from the scheduled frequency block.

The certain pattern is shared between the user equipment and a base station. In this case, the certain pattern is shared between the user equipment and the base station through an index indicating a specific pattern. Also, the certain pattern is determined indirectly using specific information shared between the user equipment and the base station. The specific information includes at least one of identifier for identifying the user equipment, identifier for identifying the base station, available frequency bandwidths, and the number of available frequency blocks.

According to the embodiments of the present invention, the following advantages can be obtained.

First of all, in a wideband communication system, a control channel is provided efficiently.

Second, in a wireless communication system that uses a plurality of frequency blocks, a control channel is provided efficiently.

Finally, a method of efficiently configuring control information in a wideband communication system is provided.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single frequency block will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size of the system block of the legacy system. On the other hand, there is no limitation in sizes of the other frequency blocks. However, for system simplification, the sizes of the other frequency blocks may be determined based on the size of the system block of the legacy system. For example, the 3GPP LTE (Release-8) system and the 3GPP LTE-A (Release-9) system are a legacy system and its evolved system.

Based on the aforementioned definition, the 3GPP LTE (Release-8) system will herein be referred to as an LTE system or the legacy system. Also, a user equipment that supports the LTE system will be referred to as an LTE user equipment or a legacy user equipment. The 3GPP LTE-A (Release-9) system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system, the LTE system and the LTE-A system are only exemplary and can be applied to all communication systems corresponding to the aforementioned definition. Also, although the embodiment of the present invention will herein be described based on FDD mode, the FDD mode is only exemplary and the embodiment of the present invention can easily be applied to H-FDD mode or TDD mode.

Figure 1A:
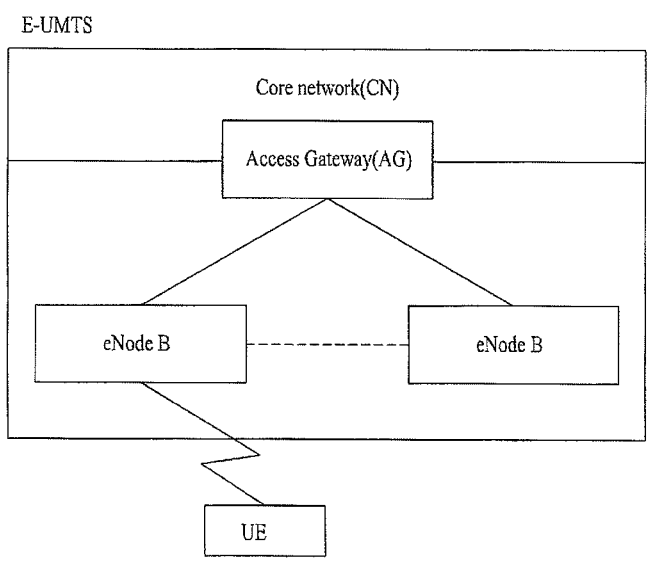
FIGS. 1A and 1B are diagrams illustrating a wireless communication system.
Figure 1B:
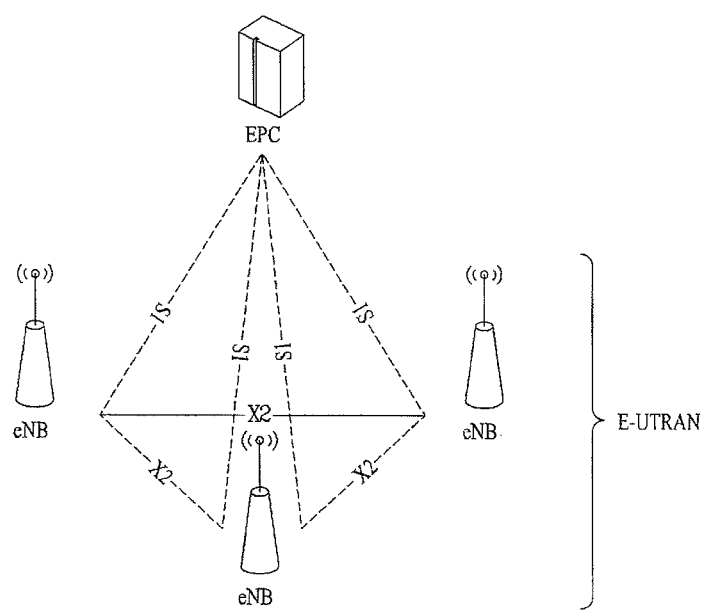
Figure 2:
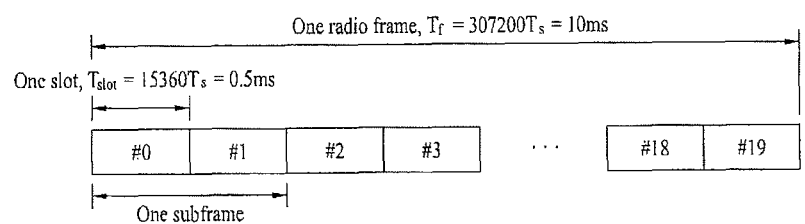
FIG. 2 is a diagram illustrating a structure of a radio frame used in 3GPP LTE.

FIG. 2 is a diagram illustrating a structure of a radio frame used in 3GPP LTE.

Referring to FIG. 2, the radio frame has a length of 10 ms (327200·$T_s$) and includes 10 subframes of an equal size. Each sub frame has a length of 1 ms and includes two slots. Each slot has a length of 0.5 ms (15360·$T_s$). In this case, $T_s$ represents a sampling time, and is expressed by $T_s=1/(15 kHz \times 2048)=3.2552 \times 10^{-8}$ (about 33 ns). The slot includes a plurality of OFDM symbols in a time region, and includes a plurality of resource blocks (RBs) in a frequency region. A transmission time interval (TTI) which is a transmission unit time of data can be determined in a unit of one or more subframes. The aforementioned structure of the radio frame is only exemplary, and various modifications can be made in the number of subframes included in the radio frame or the number of slots included subframes, or the number of OFDM symbols included in the slot.

Figure 3:
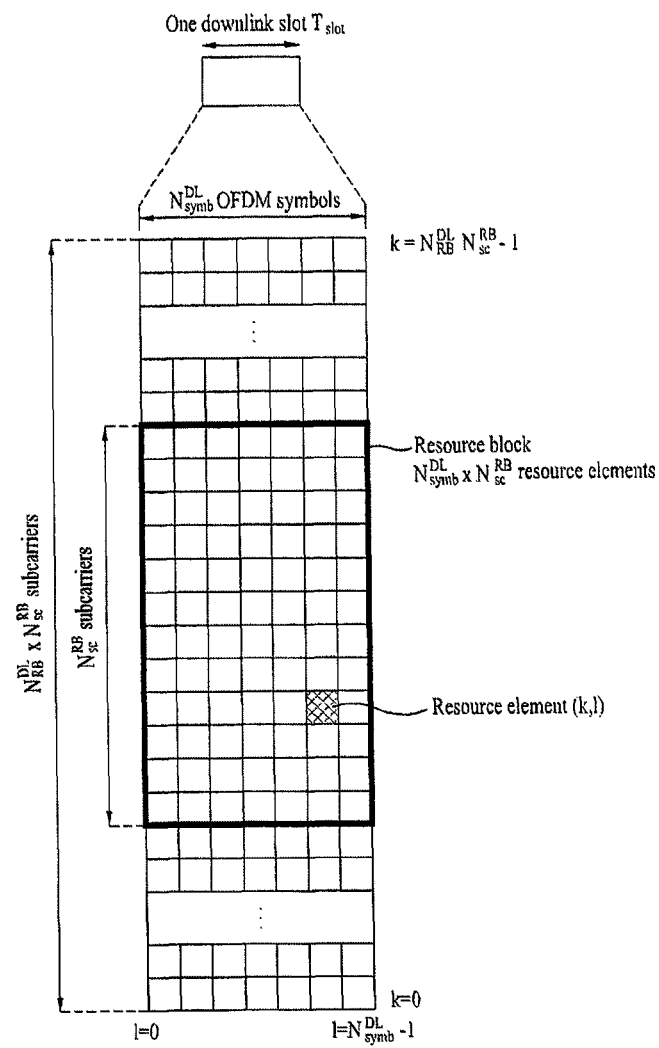
FIG. 3 is a diagram illustrating a resource grid of a downlink slot.

FIG. 3 is a diagram illustrating a resource grid of a downlink slot.

Referring to FIG. 3, the downlink slot includes $N_{symb}^{DL}$ number of OFDM symbols in a time region and $N_{RB}^{DL}$ number of resource blocks in a frequency region. Since each resource block includes $N_{sc}^{RB}$ number of subcarriers, the downlink slot includes $N_{RB}^{DL} \times N_{sc}^{RB}$ number of subcarriers in the frequency region. Although an example of FIG. 3 illustrates that the downlink slot includes seven OFDM symbols and the resource block includes twelve subcarriers, the present invention is not limited to the example of FIG. 3. For example, the number of OFDM symbols included in the downlink slot can be varied depending on a length of cyclic prefix (CP). Each element on the resource grid will be referred to as a resource element (RE). The RE is a minimum time/frequency resource defined in a physical channel, and is indicated by one OFDM symbol index and one subcarrier index. One resource block includes $N_{symb}^{DL} \times N_{sc}^{RB}$ number of REs. The number $N_{RB}^{DL}$ of resource blocks included in the downlink is subjected to a downlink transmission bandwidth established in a cell.

Figure 4:
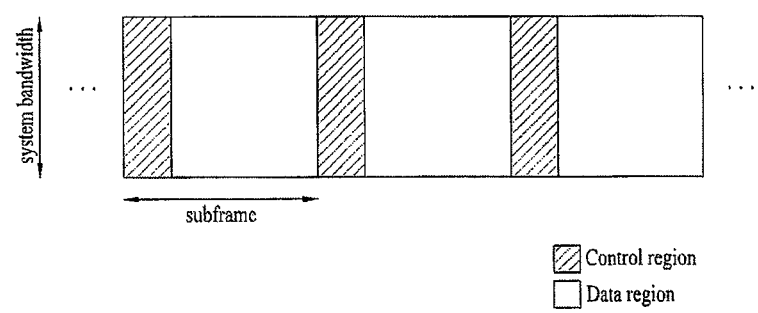
FIG. 4 is a diagram illustrating a functional structure of a downlink radio frame.

FIG. 4 is a diagram illustrating a functional structure of a downlink radio frame.

Referring to FIG. 4, the downlink radio frame includes ten subframes having an equal length. In the 3GPP LTE system, the subframes are defined as a basic time unit of packet scheduling for all downlink frequencies. Each subframe is divided into a control region for transmission of scheduling information and other control information and a data region for transmission of downlink data. The control region starts from the first OFDM symbol of the subframes and includes one or more OFDM symbols. The control region can have a size set independently per subframe. The control region is used to transmit L1/L2 (layer 1/layer 2) control signals. The data region is used to transmit downlink traffic.

Figure 5:
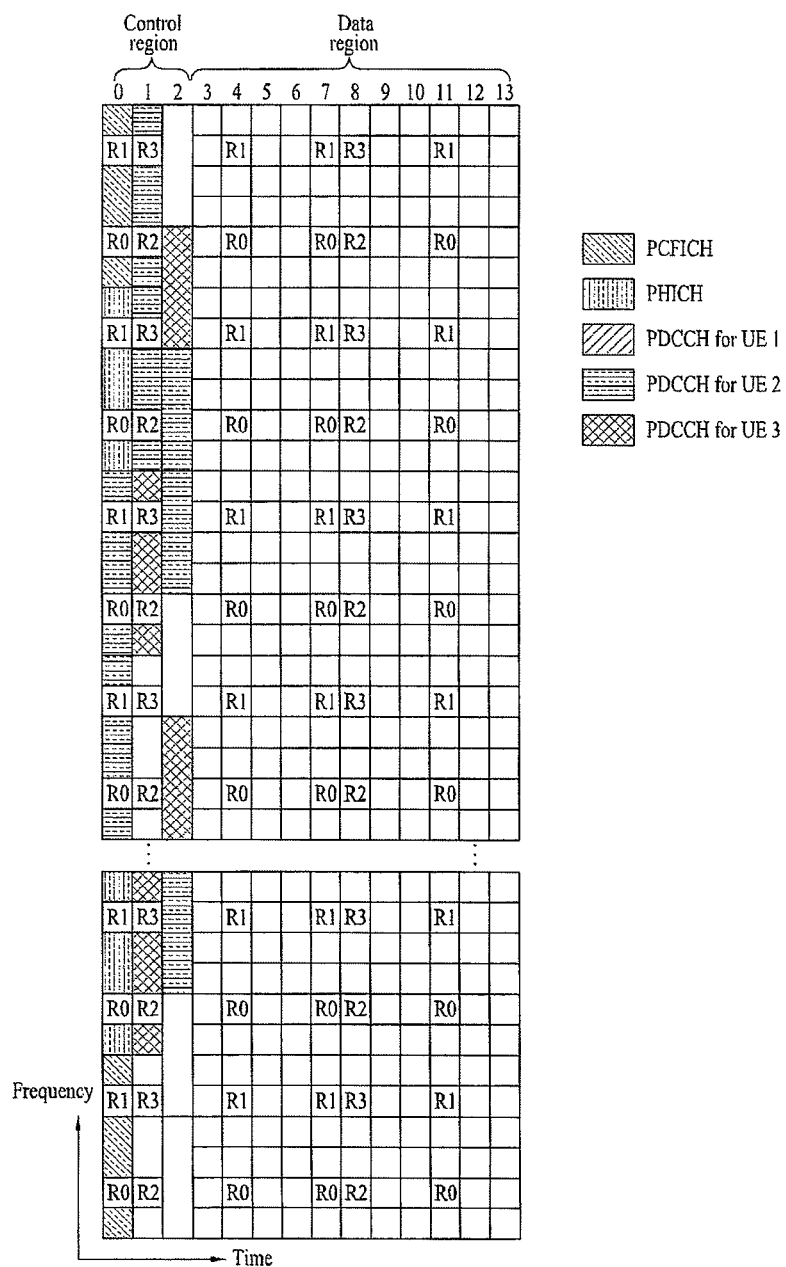
FIG. 5 is a diagram illustrating a control channel included in a control region of a subframe.

FIG. 5 is a diagram illustrating a control channel included in a control region of a subframe.

Referring to FIG. 5, the subframe includes fourteen (14) OFDM symbols. First one to three OFDM symbols are used as the control region in accordance with establishment of subframe, and other thirteen to eleven OFDM symbols are used as the data region. In FIG. 5, R1 to R4 represent reference signals (RS) or pilot signals of antennas 0 to 3. The RS is fixed by a given pattern within the subframe regardless of the control region and the data region. The control channel is allocated to a resource to which the RS is not allocated in the control region, and the traffic channel is also allocated to a resource to which the RS is not allocated in the data region. Examples of the control channel include PCFICH (Physical Control Format Indicator CHannel), PHICH (Physical Hybrid-ARQ Indicator CHannel), and PDCCH (Physical Downlink Control CHannel).

Figure 6:
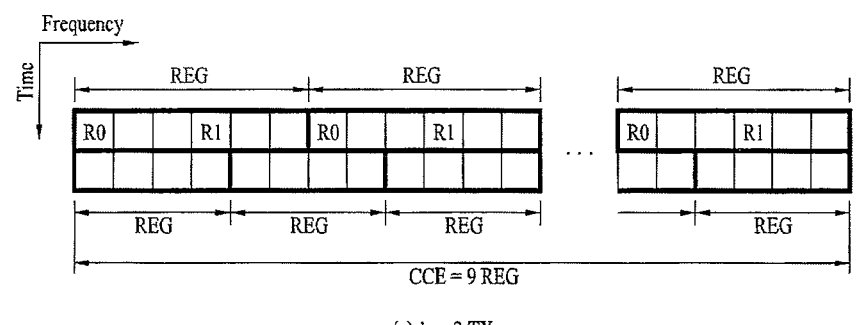
FIG. 6 is a diagram illustrating a resource allocation unit of a control channel.
Figure 6:
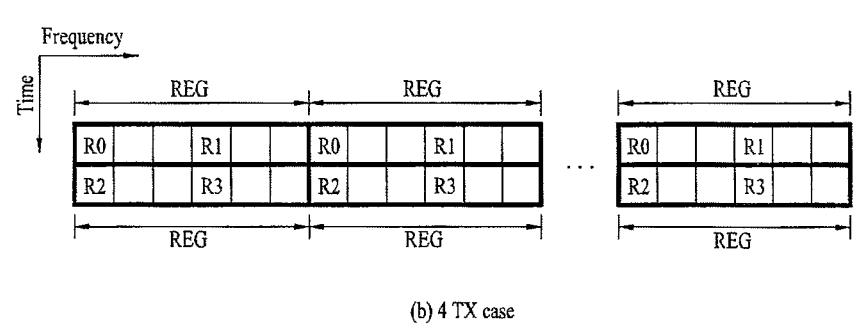

The PCFICH notifies the user equipment of the number of OFDM symbols used in the PDCCH per subframe. The PCFICH is located in the first OFDM symbol and established prior to the PHICH and the PDCCH. The PCFICH includes four resource element groups (REG), each REG being distributed in the control region based on cell identity (cell ID). One REG includes four REs. The structure of the REG will be described in detail with reference to FIG. 6. The PCFICH value indicates value of 1 to 3 or value of 2 to 4 depending on a bandwidth, and is modulated by Quadrature Phase Shift Keying (QPSK).

The PHICH is used to transmit HARQ ACK/NACK signals for uplink transmission. The PHICH includes three REGs, and is cell-specifically scrambled. The ACK/NACK signals are indicated by 1 bit, and are spread by a spreading factor (SF)=2 or 4, wherein spread signal is repeated three times. A plurality of PHICHs can be mapped with the same resource. The PHICH is modulated by Binary Phase Shift Keying (BPSK).

The PDCCH is allocated to first n number of OFDM symbols of the subframe, wherein n is an integer and is indicated by the PCIFCH. The PDCCH includes one or more CCEs, which will be described in detail later. The PDCCH notifies each user equipment or user equipment group of information related to resource allocation of transport channels, i.e., a paging channel (PCH) and a downlink-shared channel (DL-SCH), uplink scheduling grant, HARQ information, etc. The PCH and the DL-SCH are transmitted through the PDSCH. Accordingly, the base station and the user equipment respectively transmit and receive data through the PDSCH except for specific control information or specific service data. Information as to user equipment(s) (one user equipment or a plurality of user equipments) to which data of the PDSCH are transmitted, and information as to how the user equipment(s) receives and decodes PDSCH data are transmitted through the PDCCH. For example, it is assumed that a specific PDCCH is CRC masked with radio network temporary identity (RNTI) "A," and information of data transmitted using a radio resource (for example, frequency location) "B" and transmission format information (for example, transport block size, modulation mode, coding information, etc.) "C" is transmitted through a specific subframe. In this case, one or more user equipments located in a corresponding cell monitor the PDCCH using their RNTI information, and if there are one or more user equipments having RNTI "A", the user equipments receive the PDCCH and receive the PDSCH indicated by "B" and "C" through information of the received PDCCH.

FIG. 6(a) and FIG. 6(b) illustrate resource units used to configure a control channel. FIG. 6(a) illustrates that the number of transmitting antennas is 1 or 2, and FIG. 6(b) illustrates that the number of transmitting antennas is 4. Depending on the number of transmitting antennas, reference signal patterns are different but establishing a resource unit related to a control channel is identical. Referring to FIG. 6(a) and FIG. 6(b), a basic resource unit of the control channel is REG. The REG includes four neighboring resource elements excluding the reference signals. The REG is illustrated with a solid line. The PCFICH and the PHICH includes four REGs and three REGs, respectively. The PDCCH is configured in a unit of CCE, one CCE including nine REGs.

The user equipment is established to identify $M(L)(\geq L)$ number of CCEs arranged continuously or arranged by a specific rule, whereby the user equipment can identify whether the PDCCH of L number of CCEs is transmitted thereto. A plurality of L values can be considered by the user equipment to receive the PDCCH. CCE sets to be identified by the user equipment to receive the PDCCH will be referred to as a PDCCH search space. For example, the LTE system defines the PDCCH search space as expressed in Table 1.

TABLE 1

| | Search space $S_k^{(L)}$ | | | |
|---|---|---|---|---|
| Type | Aggregation level L | Size [in CCEs] | Number of PDCCH candidates $M^{(L)}$ | DCI formats |
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table, L represents the number of CCEs constituting the PDCCH, $S_k^{(L)}$ represents a PDCCH search space, and $M^{(L)}$ represents the number of PDCCH candidates to be monitored in the search space.

The PDCCH search space can be divided into a UE-specific search space that allows access to only a specific user equipment and a common search space that allows access to all user equipments within a cell. The user equipment monitors a common search space in L=4 and 8, and monitors a UE-specific search space in L=1, 2, 4 and 8. The common search space and the UE-specific search space can be overlapped with each other.

Furthermore, as for the PDCCH search space given to a certain user equipment for each L value, the location of the first CCE (i.e., CCE having the smallest index) is varied per subframe depending on the user equipment. This will be referred to as a PDCCH search space hashing.

Figure 7:
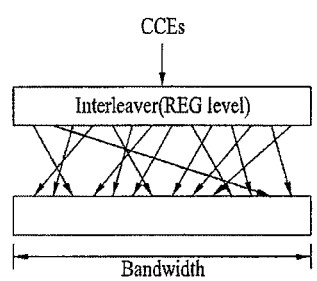
FIG. 7 is a diagram illustrating an example of a control channel element (CCE) distributed into a system band.

FIG. 7 is a diagram illustrating an example of a control channel element (CCE) distributed into a system band. Referring to FIG. 7, a plurality of logically continued CCEs are input to an interleaver. The interleaver performs interleaving of the plurality of CCEs in a unit of REG. Accordingly, the frequency/time resources constituting one CCE are physically distributed into all frequency/time regions within the control region of the subframe. As a result, although the control channel is configured in a unit of CCE, since interleaving is performed in a unit of REG, frequency diversity and interference randomization gain can be maximized.

Figure 8:
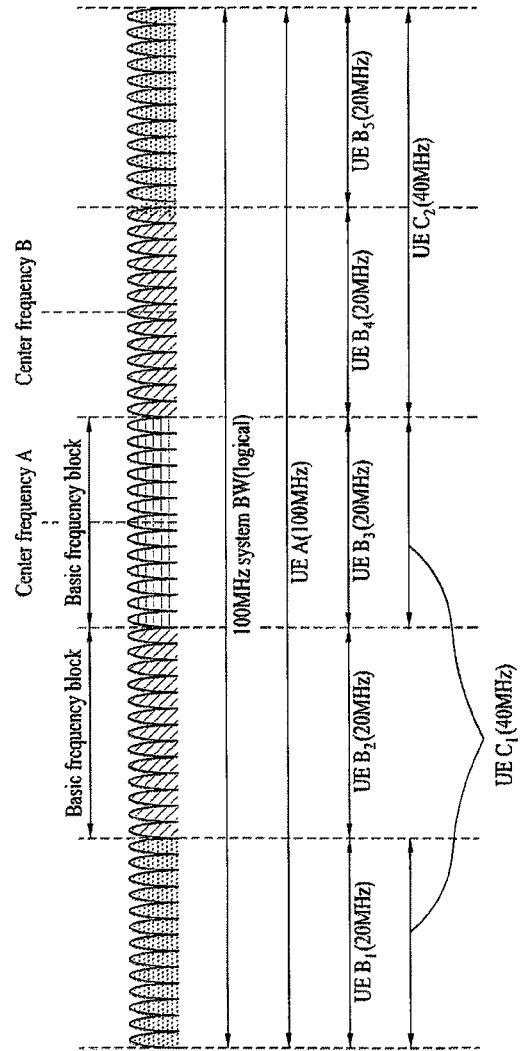
FIG. 8 is a diagram illustrating carrier aggregation.

FIG. 8 is a diagram illustrating carrier aggregation (or bandwidth aggregation). The carrier aggregation means that a plurality of frequency blocks are used as a huge logical frequency band so that the wireless communication system uses a wider frequency band.

Referring to FIG. 8, in the wideband system, all system bandwidths (BW) are logical bandwidths and have a bandwidth of 100 MHz. The system bandwidths include five basic frequency blocks, each of which has a bandwidth of 20 MHz. The basic frequency block includes one or more physically consecutive subcarriers. Hereinafter, the basic frequency block will simply be referred to as a frequency block. Although it is assumed that the respective frequency blocks have the same bandwidth, this is only exemplary and the frequency blocks can have different sizes. Also, although it is illustrated that the respective frequency blocks adjoin to each other in the frequency region, this illustration is logically exemplary and the respective frequency blocks may physically adjoin to each other or spaced apart from each other. Center carriers may be used differently for the respective frequency blocks, or one common center frequency may be used to physically adjoined frequency blocks. For example, if it is assumed that all frequency blocks physically adjoin to one another in FIG. 8, center carrier A can be used. Also, if it is assumed that all frequency blocks physically do not adjoin to one another in FIG. 8, center carrier A, center carrier B and the like can be used separately for the respective frequency blocks. The bandwidth of each frequency block can be established in the same manner as the system bandwidth of the legacy system. As the bandwidth of the frequency block is based on the legacy system, it is possible to facilitate backward compatibility and system design in a radio communication environment where an evolved user equipment and a legacy user equipment coexist. For example, if the LTE-A system supports carrier aggregation, bandwidths of the respective frequency blocks can be established in the same manner as the system bandwidths of the LTE system. In this case, the bandwidth of each frequency block can have any one of 1.25, 2.5, 5, 10, 20 MHz, and their multiple numbers.

If the whole system bandwidth is extended by frequency aggregation, the frequency bandwidth used for communication of user equipments is defined in a unit of frequency block. User equipment A can use 100 MHz which is the whole system bandwidth, and performs communication using all of five frequency blocks. User equipments $B_1$ to $B_5$ can use only a bandwidth of 20 MHz and perform communication using one frequency block. User equipments $C_1$ to $C_2$ can use a bandwidth of 40 MHz and perform communication using two frequency blocks. The two frequency blocks may logically/physically adjoin to each other or not. The user equipment $C_1$ represents that two frequency blocks which do not adjoin are used, the user equipment $C_2$ represents that two frequency blocks which adjoin to each other are used. Also, although not shown, among a total of frequency blocks, one or more frequency blocks can be used as the system blocks of the legacy block to support the legacy user equipment.

Figure 9:
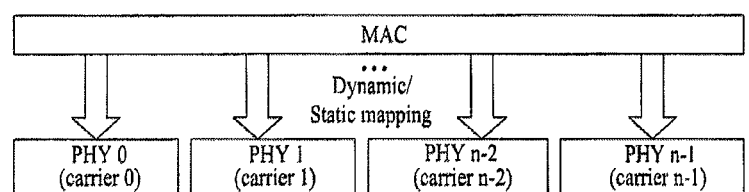
FIG. 9 to FIG. 11 are block diagrams illustrating a transmitter and a receiver for carrier aggregation.
Figure 9:
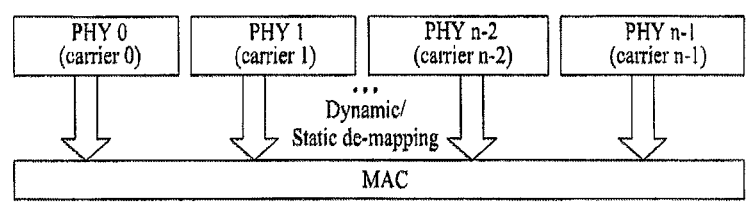
Figure 10:
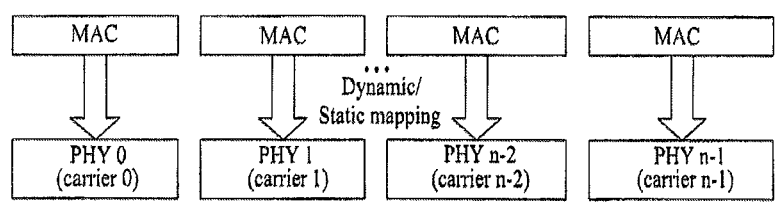
Figure 10:
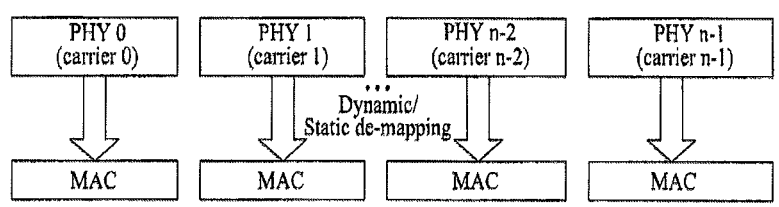
Figure 11:
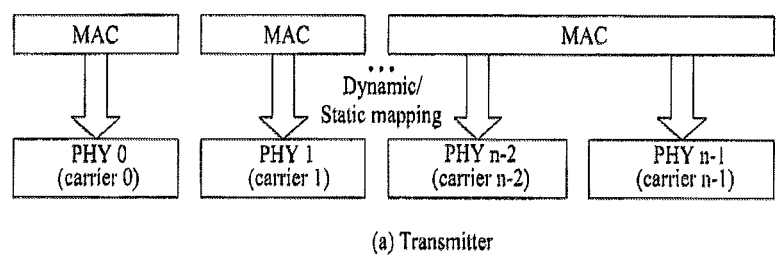
Figure 11:
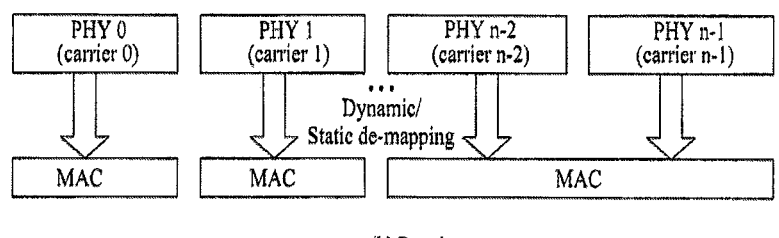

FIG. 9 to FIG. 11 are block diagrams illustrating a transmitter and a receiver for carrier aggregation. PHY0, PHY1, . . . , PHY n–1 represent physical layers of the respective frequency blocks. Carrier 0, carrier 1, . . . , carrier n–1 represent center carriers. Although these drawings illustrate that separate center carrier is used per frequency block, the same center carrier may be used for a plurality of frequency blocks which physically adjoin to one another.

Referring to FIG. 9, in a transmitter (a), one MAC entity manages a plurality of frequency blocks. The MAC entity means a functional unit/block performed by a media access control (MAC) layer. In case of the 3GPP LTE system, the MAC layer is connected with a lower layer, i.e., a physical layer through a transport channel, and is connected with an upper layer, i.e., a radio link control (RLC) layer through a logical channel. The MAC layer serves to map various logical channels with various transport channels, and supports resource scheduling, HARQ action, etc. A data block transferred to the physical layer through the transport channel will be referred to as a transport block. The transport block corresponds to a minimum data unit allocated by a scheduler of the MAC layer to the physical layer per data transmission. Although FIG. 9 illustrates that different transport blocks are transferred through different frequency blocks, this is exemplary and the same transport block may be transmitted through a plurality of frequency blocks.

Referring to FIG. 10, in the transmitter (a), one MAC entity manages one frequency block. Namely, the MAC layer and the physical layer have a one-to-one mapping relation. Referring to FIG. 11, in the transmitter (a), among a plurality of MAC entities, a first MAC entity manages one frequency block and a second MAC entity manages two or more frequency blocks. Namely, the transmitter of FIG. 11 manages/performs frequency aggregation in a hybrid type of FIG. 9 and FIG. 10. Accordingly, the MAC layer and the physical layer represent a one-to-one mapping relation or a one-to-multiple mapping relation. In FIG. 9 to FIG. 11, a receiver (b) is configured in a reverse manner of the transmitter (a).

Figure 12:
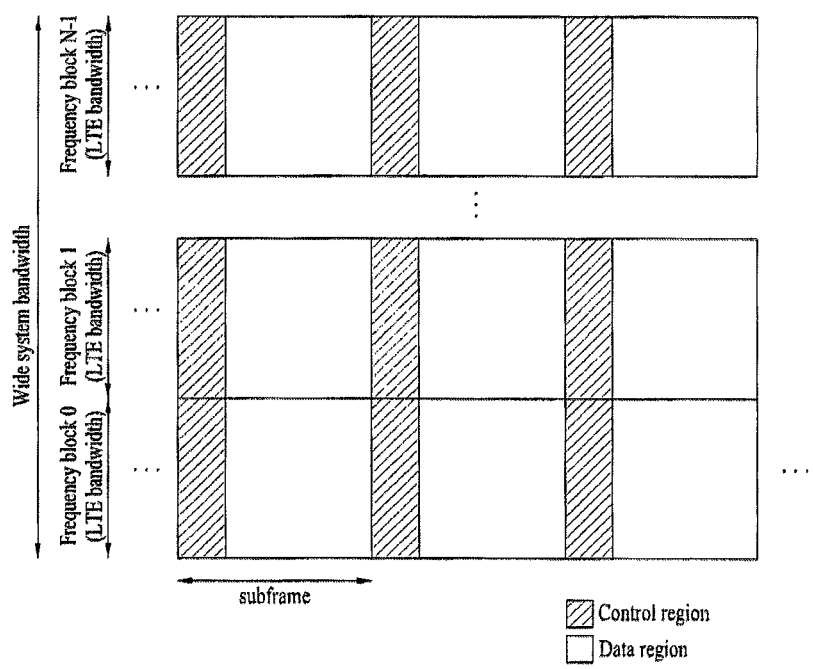
FIG. 12 is a diagram illustrating a structure of a radio frame to which carrier aggregation is applied.

FIG. 12 is a diagram illustrating a structure of a radio frame to which carrier aggregation is applied.

Referring to FIG. 12, the LTE-A system can extend the system bandwidth by binding frame structures N defined in the LTE system. In this case, each frame structure is transmitted and received through its corresponding frequency block. For a radio frame structure of the LTE system block, refer to FIG. 4. For convenience, FIG. 12 illustrates only a downlink frame structure that supports a frequency division dulplex (FDD) mode. Since user equipments that support the LTE system only can transmit and receive data through one of N number of frequency blocks, the PDCCH search space should be limited to the control region within each frequency block. Also, PDCCH hashing should follow the existing LTE structure. Specifically, the PDCCH search space for user equipments that supports the LTE system only can be limited to the control region within a specific frequency block established as a system block of the legacy system among all frequency blocks.

However, such a limitation is not required for the LTE-A user equipments that can be operated in the extended wideband communication system. Accordingly, in respect of the PDCCH search space, two methods can be considered. The first method is to distribute the PDCCH search space over a plurality of frequency blocks without limitation to a specific frequency block. Namely, one control region is established for a plurality of frequency blocks. The first method can increase frequency diversity and interference randomization gain by using the plurality of frequency blocks. The second method is to limit the PDCCH search space to a specific frequency block. Namely, a control region is established independently per frequency block, and the PDCCH search space is established within the independent control region. In this case, PDCCH hashing is established per frequency block. The second method is advantageous for backward compatibility for LTE user equipment and system design. In this case, frequency diversity and interference randomization gain may be more reduced at a specific transmission time as compared with the first method. However, as the time passes, the frequency block where the PDCCH search space is established is changed, whereby frequency diversity and interference randomization gain can be obtained. The method will be described in detail with reference to FIG. 13 to FIG. 18.

Although this embodiment is described using the PDCCH, this is only exemplary and the embodiment may equally be applied to the PHICH. Namely, the PHICH may be distributed into a plurality of frequency blocks, or may be limited to a specific frequency block. The embodiment of the present invention can be applied to all cases where a control channel is transmitted using a plurality of frequency blocks.

Meanwhile, although the system bandwidth includes N number of frequency blocks, the frequency band that can be received by a specific user equipment can be limited to M(<N) number of frequency blocks. Herein, the value N may be replaced with a value M established differently per user equipment. For convenience, frequency block indexes 0, 1, 2, ... , N−1 are given to the N number of frequency blocks, and the frequency blocks are expressed by n. Also, the number of CCEs existing in frequency block n within a certain subframe is expressed by N_CCE(n). For example, N_CCE(2) represents the number of CCEs existing in frequency block 2. As the case may be, N_CCE(n) may be limited to some CCE not all CCEs existing in frequency block n.

Figure 13:
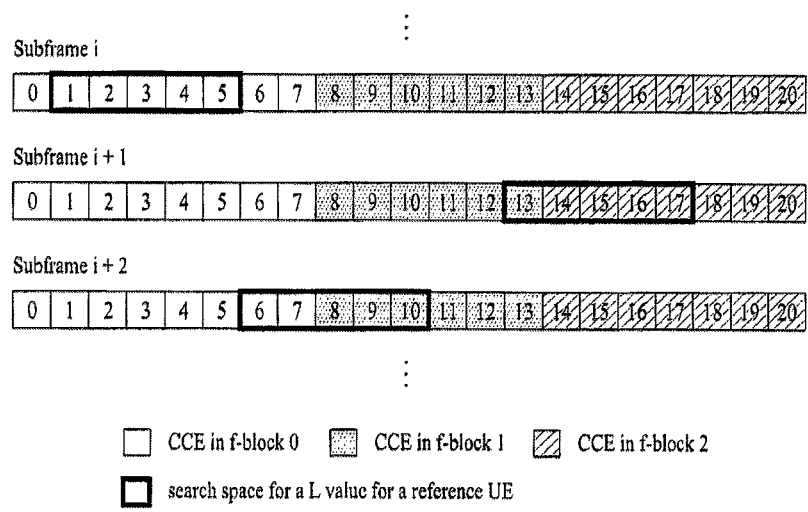
FIG. 13 to FIG. 15 are diagrams illustrating examples of establishing a physical downlink control channel (PDCCH) search space in accordance with one embodiment of the present invention.

FIG. 13 is a diagram illustrating an example of establishing a physical downlink control channel (PDCCH) search space in accordance with one embodiment of the present invention. In this embodiment, CCE indexes are defined continuously over N number of frequency blocks. Namely, for user equipments that can receive the PDCCH through N number of frequency blocks, CCE indexes can be defined continuously over N number of frequency blocks.

For example, CCE indexes are allocated continuously within one frequency block. If CCE indexes are all given to CCEs within the corresponding frequency block, subsequent CCE indexes are allocated to CCEs of next frequency block. For example, CCE indexes 0~N_CCE(0)−1 are allocated to CCE of frequency block 0. Afterwards, CCE indexes N_CCE(0)~N_CCE(0)+N_CCE(1)−1 are allocated to CCEs of frequency block 1, and CCE indexes N_CCE(0)+N_CCE(1)~N_CCE(0)+N_CCE(1)+N_CCE(2)−1 are allocated to CCEs of frequency block 2. In this way, indexes can be allocated continuously to CCEs within a plurality of frequency blocks. It is assumed that PDCCH includes L number of CCEs. In this case, the PDCCH search space can be defined with M(L) number of CCEs continued or arranged by a specific rule, based on CCE indexes allocated continuously for N number of frequency blocks. Also, PDCCH search space hashing can be defined for N number of frequency blocks.

In detail, FIG. 13 illustrates an example of N=3, N_CCE(0)=8, N_CCE(1)=6 and N_CCE(2)=7. In this case, it is assumed that one PDCCH includes CCEs of continued indexes, and the number of CCEs included in each frequency block is constant regardless of subframe. However, this assumption is simplified for illustration, and the number of CCEs included in each frequency block, the number of CCEs constituting PDCCH, PDCCH search space, PDCCH hashing, etc. can be established variously depending on a communication status. In case of FIG. 13, CCE indexes of 0-20 are continuously given to three frequency blocks {0-7: 8-13: 14-20}. The PDCCH search space includes five CCEs which are continued, and its start location is changed in the order of CCE 1=>CCE 13=>CCE 6 depending on subframe. Namely, the PDCCH search space and hashing are defined for a plurality of frequency blocks.

In this embodiment, since a PDCCH search space for a certain user equipment can be limited to one or a small number of frequency blocks at a specific time, frequency diversity gain may not be great. However, since the PDCCH search space is changed to a certain location of N number of frequency blocks by hashing per subframe, interference randomization effect can be obtained.

Figure 14:
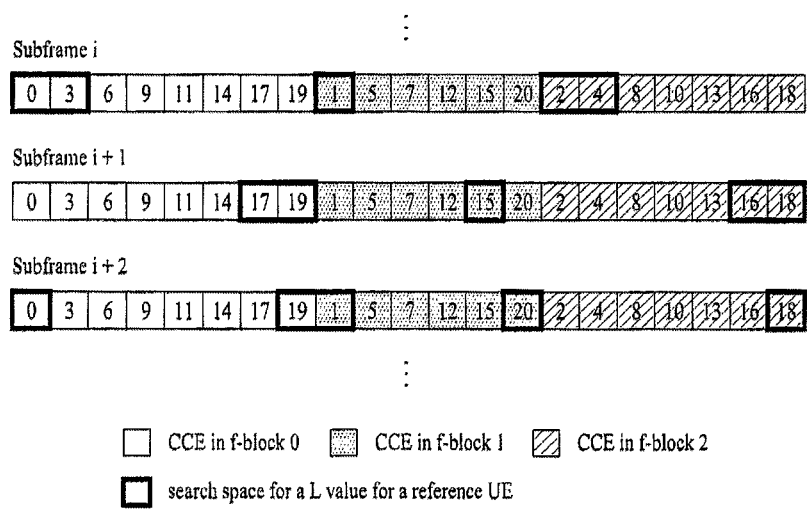

FIG. 14 is a diagram illustrating an example of establishing a PDCCH search space in accordance with another embodiment of the present invention. In this embodiment, the PDCCH search space is distributed into N number of frequency blocks. Namely, if one PDCCH includes L number of CCEs, for a certain user equipments that can receive the PDCCH through N number of frequency blocks, M(L) number of CCEs constituting the PDCCH search space can be distributed into N number of frequency blocks in a random manner.

For example, frequency block indexes and CCE indexes within each frequency block are combined with each other for N_CCE(0), N_CCE(1), ... N_CCE(N−1) number of CCE indexes existing in N number of different frequency blocks, whereby new indexes can be allocated to a total of N_CCE(0)+N_CCE(1)+ ... +N_CCE(N−1) number of CCEs. New indexes can be defined in such a manner that CCEs of continued indexes are distributed into a certain frequency blocks of N number of frequency blocks, not necessarily into the same frequency block. It is assumed that PDCCH includes L number of CCEs. In this case, the PDCCH search space can be defined for M(L) number of CCEs logically continued or arranged by a specific rule, based on CCE indexes newly given for N number of frequency blocks. Also, PDCCH search space hashing can be defined for N number of frequency blocks based on the newly given CCE indexes.

In detail, FIG. 14 illustrates an example of N=3, N_CCE(0)=8, N_CCE(1)=6 and N_CCE(2)=7. In this case, it is assumed that one PDCCH includes CCEs of continued indexes, and the number of CCEs included in each frequency block is constant regardless of subframe. However, this assumption is simplified for illustration, and the number of CCEs included in each frequency block, the number of CCEs constituting PDCCH, PDCCH search space, PDCCH hashing, etc. can be established variously depending on a communication status. In case of FIG. 14, the newly given CCE indexes are given to three frequency blocks in a manner of {0,3,6,9,11,14,17,19: 1,5,7,12,15,20: 2,4,8,10,13, 16,18}. The PDCCH search space includes five CCEs which are continued, and its start location is changed in the order of CCE 0=>CCE 15=>CCE 20 depending on subframe. Namely, the PDCCH search space and hashing are defined for a plurality of frequency blocks. Particularly, the PDCCH search space is distributed within a plurality of frequency blocks in a unit of CCE.

In this embodiment, since the PDCCH for a certain user equipment is distributed into N number of frequency blocks in a unit of CCE at a specific time, frequency diversity and interference randomization gain can be obtained. Also, since the PDCCH search space and hashing are defined for N number of frequency blocks, frequency diversity and interference randomization gain can be obtained.

Figure 15:
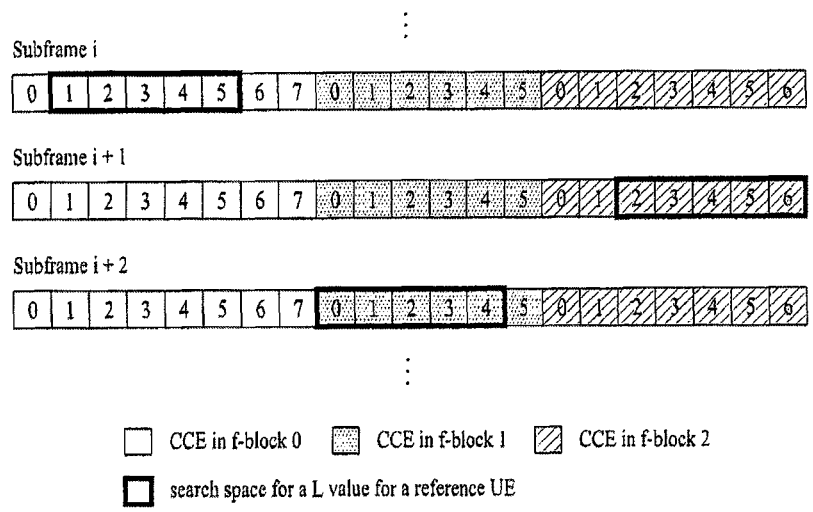

FIG. 15 is a diagram illustrating an example of establishing a PDCCH search space in accordance with still another embodiment of the present invention. In this embodiment, the location of the PDCCH search space is hopped into one of N number of frequency blocks depending on time.

For example, for a certain user equipment that can receive the PDCCH through N number of frequency blocks, a control region, PDCCH search space, and PDCCH search space hashing can be defined within one frequency block like the existing 3GPP LTE. In this case, a specific frequency block where the PDCCH search space for the user equipment exists can be changed according to a random pattern per subframe or in a unit of a certain number of subframes. Also, the specific frequency block can be changed according to a certain pattern. The certain pattern can be shared between the base station and the user equipment through system information, radio resource control (RRC) signaling, etc. The certain pattern can be a predetermined one, or can be generated in accordance with a given rule. The certain pattern can be determined or indirectly indicated using information shared between the base station and the user equipment. For example, the certain pattern can be determined or indirectly indicated using at least one of user equipment identifier, base station identifier, and frequency bandwidth (for example, the number of frequency blocks). If the certain pattern is previously determined, the base station and the user equipment may previously store a plurality of patterns therein. In this case, information of the certain pattern can be shared using index indicating a specific pattern of a plurality of patterns. The certain pattern can be repeated with a given period that can be defined in a unit of a multiple of subframe or multiple of radio frame. Since the frequency block through which the PDCCH is transmitted is varied depending on time, the frequency block which the corresponding user equipment tries decoding is also varied depending on time. Also, a change pattern of the frequency block to which the PDCCH is transmitted can be established differently per user equipment. Also, a hashing pattern of the PDCCH search space can be established differently even for the same user equipment within each frequency block.

In detail, FIG. 15 illustrates an example of N=3, N_CCE(0)=8, N_CCE(1)=6 and N_CCE(2)=7. In this case, it is assumed that one PDCCH includes CCEs of continued indexes, and the number of CCEs included in each frequency block is constant regardless of subframe. However, this assumption is simplified for illustration, and the number of CCEs included in each frequency block, the number of CCEs constituting PDCCH, PDCCH search space, PDCCH hashing, etc. can be established variously depending on a communication status. In case of FIG. 15, CCE indexes are independently given to each frequency block and continuously given within each frequency block {0-7: 0-5: 0-6}. The PDCCH search space includes five CCEs which are continued, and its start location is changed in the order of (frequency block 0, CCE 1)=>(frequency block 2, CCE 2)=>(frequency block 1, CCE 0) depending on subframe. Namely, the PDCCH search space and hash are defined within the frequency blocks.

In this embodiment, since the PDCCH for a certain user equipment exists in only one frequency block at a specific time, frequency diversity gain cannot be obtained. However, since the frequency block to which the PDCCH is transmitted is varied in accordance with the lapse of time, frequency diversity and interference randomization gain can be obtained based on a given time interval.

Figure 16:
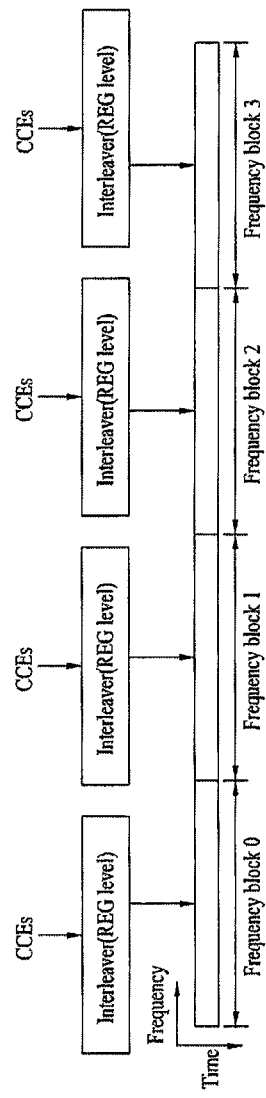
FIG. 16 is a diagram illustrating an example of mapping a control channel with each frequency block in accordance with one embodiment of the present invention.

FIG. 16 is a diagram illustrating an example of mapping a control channel with each frequency block in accordance with one embodiment of the present invention. For convenience, the method of FIG. 15 is used. According to the method of FIG. 15, the control region is established independently per frequency block. Accordingly, the control channel is also established independently per frequency block. Examples of the control channel include, but not limited to, PDCCH, PHICH, and PCFICH. For convenience, the PDCCH will be described as an example of the control channel. The PDCCH includes one or more CCEs. A plurality of PDCCHs constitute a PDCCH search space for a specific user equipment.

Referring to FIG. 16, in the wideband system, the whole system band includes a plurality of frequency blocks. The bandwidth of each frequency block can be established based on a system band of a narrowband system. For example, each frequency block can be established to have the same size as that of the system block of the LTE which is the legacy system. When the PDCCH is mapped with the physical channel, the PDCCH is interleaved in a unit of REG through the interleaver and then distributed within the frequency band. Since the PDCCH is established independently per frequency block, the interleaver is operated in a unit of frequency block. In detail, FIG. 16 illustrates that the system band of the wideband system includes four frequency blocks and the interleaver operated in a unit of REG per frequency block is used. There is not limitation in the number of frequency blocks where the PDCCH is established for a specific user equipment at a specific time. However, in the embodiment of the present invention, it is assumed that the number of frequency blocks where the PDCCH is established for a specific user equipment is smaller than a total of frequency blocks. Extremely, the number of frequency blocks where the PDCCH is established for a specific user equipment may be one. For example, as the time passes, the frequency block where the PDCCH is established can be established in such a manner as {frequency block 0, frequency block 1}=>{frequency block 0, frequency block 3}=>{frequency block 1, frequency block 2, frequency block 3}. Also, as the time passes, the frequency block where the PDCCH is established can be established in such a manner as {frequency block 1}=>{frequency block 0}=>{frequency block 3}. Although hash of the PDCCH search space is performed independently per frequency block, it is not illustrated in detail in FIG. 16.

For convenience, the block diagram of FIG. 16 illustrates an example of implementing the method of FIG. 15. However, this is only exemplary, and the block diagram of FIG. 16 can easily be varied to implement the methods of FIG. 13 and FIG. 14. For example, for application to the method of FIG. 13, FIG. 16 can be varied in such a manner that the whole system band includes one interleaver. Also, for application to the method of FIG. 14, FIG. 16 can be varied in such a manner that the whole system band includes a first interleaver operated in a level of CCE and a second interleaver operated in a level of REG for CCE output from the first interleaver.

Figure 17:
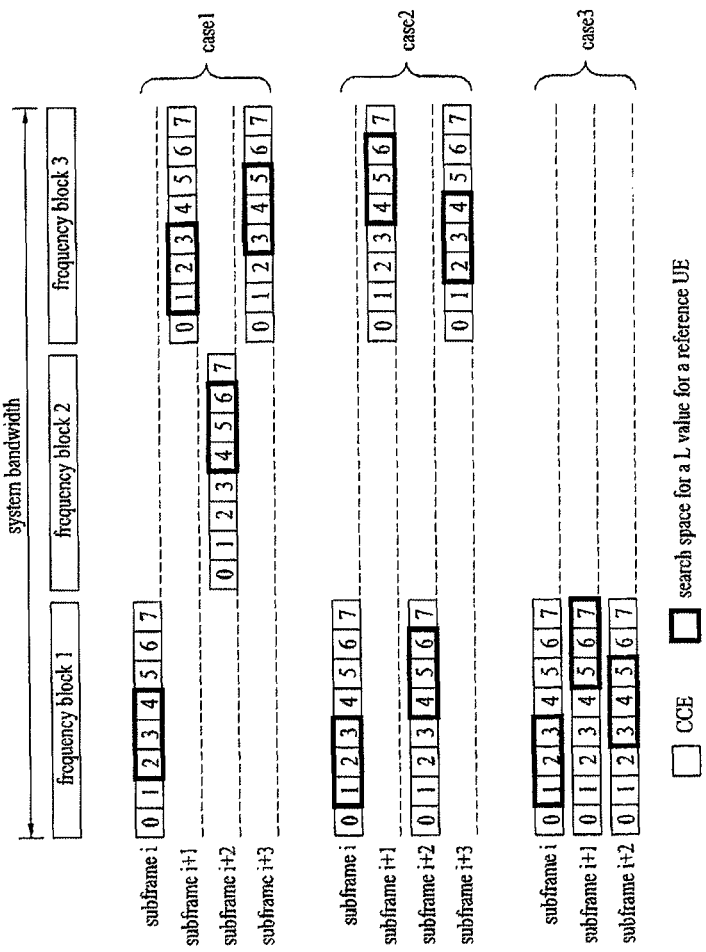
FIG. 17 is a diagram illustrating an example of establishing a physical downlink control channel (PDCCH) search space within a plurality of frequency blocks in accordance with one embodiment of the present invention.

FIG. 17 is a diagram illustrating an example of establishing a PDCCH search space within a plurality of frequency blocks in accordance with one embodiment of the present invention. For convenience, it is assumed that the respective frequency blocks include the same number of CCEs. It is also assumed that the size of the PDCCH search space is constant regardless of frequency block and subframe. Furthermore, it is assumed that the PDCCH is established for one frequency block at a specific transmission time.

Figure 18:
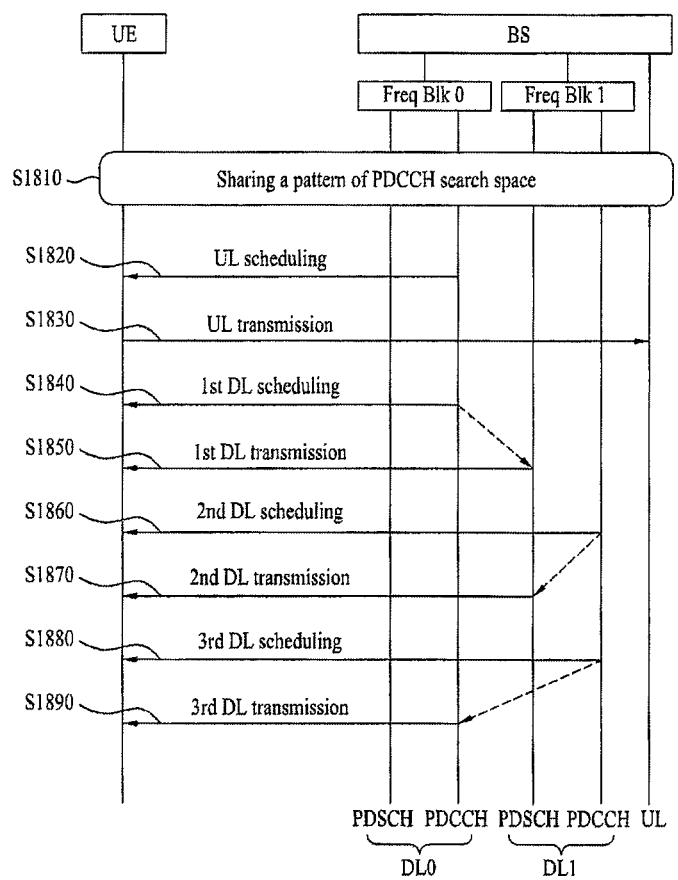
FIG. 18 is a diagram illustrating an example of transmitting or receiving data to and in a user equipment in accordance with control information in accordance with one embodiment of the present invention.

Referring to FIG. 17, a specific user equipment can receive the PDCCH through all frequency blocks or some frequency blocks. The number of frequency blocks that can receive the PDCCH can be determined depending on user equipment capability, data transmission requirements, user policies, etc. When a specific user equipment can receive the PDCCH through all frequency blocks (case 1), a specific frequency block where the PDCCH search space is established for the user equipment can be changed in a unit of subframe. Meanwhile, when a specific user equipment can receive the PDCCH through some frequency blocks (cases 2 and 3), a specific frequency block where the PDCCH search space is established for the user equipment can be changed in a unit of subframe within the corresponding some frequency blocks. For the method of changing the specific frequency block, refer to the description of FIG. 15. Also, the first CCE index where the PDCCH search space starts can be changed depending on transmission time and/or frequency block and/or user equipment. P FIG. 18 is a diagram illustrating an example of transmitting or receiving data to and in a user equipment in accordance with control information in accordance with one embodiment of the present invention. For convenience, it is assumed that the system band of the wideband system includes two frequency blocks. Also, frequency blocks are not illustrated separately for an uplink.

Referring to FIG. 18, the user equipment and the base station share information of a pattern of the PDCCH search space (S1810). In this case, the pattern of the PDCCH search space includes a pattern of a specific frequency block where the PDCCH or the PDCCH search space is established or a hash pattern of the PDCCH search space. The information of the pattern can be indicated directly, or can be indicated indirectly using other information shared between the user equipment and the base station. Also, the information of the pattern can be shared between the user equipment and the base station through system information, RRC signaling, etc. At the first time, the user equipment receives an uplink (UL) scheduling signal included in the PDCCH through frequency block (Freq Blk) 0 (S1820). In this case, the user equipment performs UL transmission using time/frequency resources indicated by the base station in accordance with the UL scheduling signal (S1830). The frequency resource for UL transmission may not need to be the same as the frequency block where the UL scheduling information is received. Afterwards, at the second or fourth time, the user equipment receives a downlink (DL) scheduling signal included in the PDCCH through frequency block 0 or frequency block 1 (S1840, S1860, and S1880). In this case, the user equipment receives DL transmission using time/frequency resources indicated by the base station in accordance with the DL scheduling signal (S1850, S1870 and S1890). The frequency resource for DL transmission may not need to be the same as the frequency block where the DL scheduling information is received. For example, if the user equipment receives the DL scheduling signal from frequency block 0, DL transmission can be performed through frequency block 0 and/or frequency block 1. Likewise, if the user equipment receives the DL scheduling signal from frequency block 1, DL transmission can be performed through frequency block 0 and/or frequency block 1.

As illustrated in FIG. 18, in the wireless communication system, the base station controls data transmission and reception of the user equipment. Namely, for downlink data, the base station transmits downlink scheduling information to the corresponding user equipment to notify the corresponding user equipment of time/frequency regions where data will be transmitted, encoding scheme, data size, HARQ related information, etc. Also, in order that the user equipment transmits uplink data to the base station, the base station transmits uplink scheduling information to the corresponding user equipment to notify the corresponding user equipment of time/frequency regions that can be used by the corresponding user equipment, encoding scheme, data size, HARQ related information, etc. In the LTE system, scheduling information is transmitted to the user equipment through the PDCCH.

For convenience, the information of the time/frequency regions where data will be transmitted will be referred to as resource allocation (RA) information, the information of data size will be referred to as transport block (Trblk) information, and the HARQ related information will be referred to as HARQ information. Generally, it is assumed that one HARQ process processes one transport block. Also, a plurality of transport blocks can be transmitted and received to and in one user equipment in such a manner that they are spatially multiplexed in a multiple input multiple output (MIMO) transmission and reception mode. For convenience, a bundle of transport blocks which are bound through spatial multiplexing in a MIMO transmission/reception will be defined as a transport block bundle. In this case, the transport block bundle may include one transport block when spatial multiplexing is not applied.

For an example of the aforementioned information, in case of the LTE system, the resource allocation information can include various kinds of information such as resource allocation format, location/size of time/frequency resources, and resource hopping. The resource allocation format can indicate unit of time/frequency resources and information of location relation between time/frequency resources. The time/frequency resources can be indicated using a bitmap in a unit of resource block or resource block group. The transport black information can include various kinds of information such as data size and modulation and coding scheme. The data size can be indicated directly, or can be indicated indirectly using allocated resources and modulation degree. The HARQ information includes various kinds of information such as HARQ process number, the presence of new data, and redundancy version (RV). The scheduling information can include codebook information and MIMO information related to a precoding matrix indicator (PMI). To configure the scheduling information, examples of the aforementioned information can be bound in a given order to form one bit stream. The formed bit stream can be transmitted to the corresponding user equipment through the PDCCH after undergoing CRC masking using RNTI, channel coding and rate matching.

If communication is performed using a plurality of frequency blocks, scheduling information transmitted through the control channel can be configured by two methods. According to the first method, scheduling is performed independently per frequency block. For example, scheduling information transmitted through the PDCCH can indicate resource allocation information only for one frequency block. In this case, it is possible to backward compatibility for the legacy user equipment that supports narrowband transmission and reception only. According to the second method, scheduling is performed by binding a plurality of frequency blocks. For example, the scheduling information transmitted through the PDCCH can indicate resource allocation information of a plurality of frequency blocks. In this case, limited resources of the control region can be used efficiently. Also, there is no need to receive all frequency blocks to receive the PDCCH.

It is possible to easily implement the first method by modifying the second method. Accordingly, the second method will be described in detail with reference to the accompanying drawings.

Figure 19:
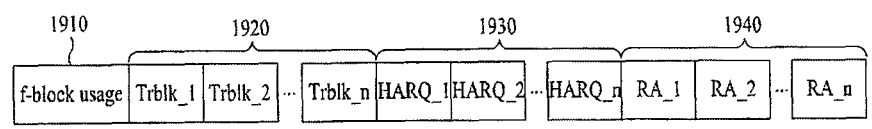
FIG. 19 to FIG. 24 are diagrams illustrating an example of configuring scheduling information for a plurality of frequency blocks in accordance with one embodiment of the present invention.
Figure 20:
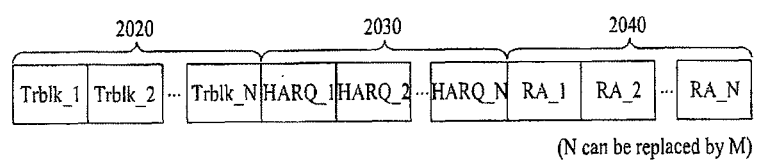

FIG. 19 to FIG. 20 are diagrams illustrating an example of configuring scheduling information of a plurality of frequency blocks in accordance with one embodiment of the present invention. In this embodiment, different transport block bundles are allocated to different frequency blocks. For convenience, it is assumed that the number of frequency blocks that can be used for transmission and reception within the system band of the wideband system by a specific user equipment is M($\leq$N). In this case, N represents the number of all frequency blocks. M can be established for each user equipment in accordance with transmission and reception capability of the user equipment or decision of the base station.

The user equipment is established for each of M number of frequency blocks to transmit and receive different transport block bundles. In this case, for the same user equipment, HARQ process is operated independently for different frequency blocks. For example, retransmission of a transport block where initial transmission is performed through frequency block 1 and retransmission of a transport block where initial transmission is performed through frequency block 2 are performed independently at the same time. Of course, different transport blocks constituting one transport block bundle within the same frequency block can be operated independently through their independent HARQ process. Specifically, the uplink/downlink scheduling information can be defined by two different methods illustrated in FIG. 19 and FIG. 20.

FIG. 19 illustrates that scheduling information is assigned only for a frequency block where actual data transmission and reception is performed at a certain time. Referring to FIG. 19, the scheduling information includes information (f-block usage) 1910 indicating a corresponding one of N or M number of frequency blocks, through which data transmission and reception is performed, transport block bundle information (Trblk) 1920 transmitted through each frequency block when the number of frequency blocks where actual data transmission and reception is performed at the corresponding time is n, HARQ information 1930, and resource allocation (RA) information 1940. The scheduling information can further include other information (for example, MIMO related information) if necessary. A combination order of information can be determined optionally. Particularly, the f-block usage information 1910 can be defined in a bitmap of N or M bits for N or M number of frequency blocks. In this case, amount of required information can be flexibly modified depending on the number of frequency blocks actually scheduled to the corresponding user equipment at a certain time. Accordingly, it is advantageous in that overhead of scheduling information signaling can be optimized. On the other hand, since the user equipment does not know the number of frequency blocks which will be scheduled thereto, a problem occurs in that formats of scheduling information to be searched by the user equipment increase.

FIG. 20 illustrates that scheduling information is always assigned for N or M number of frequency blocks. Referring to FIG. 20, the scheduling information always includes Trblk information 2020 of N or M number of frequency blocks, HARQ information 2030, and resource allocation (RA) information 2040. The scheduling information can further include other information (for example, MIMO related information) if necessary. A combination order of information can be determined optionally. In this case, even though the base station schedules frequency blocks smaller than N or M number of frequency blocks to the user equipment at a certain time, since scheduling information transmitted to the user equipment always includes scheduling information of N or M number of frequency blocks, signaling overhead of scheduling information becomes higher. On the other hand, since scheduling information is not varied depending on the number of frequency blocks which are scheduled, it is advantageous in that formats of scheduling information to be searched by the user equipment are reduced.

Figure 21:
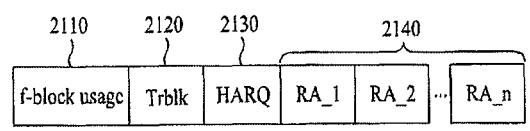
Figure 22:
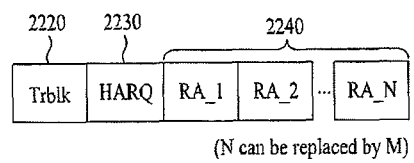

FIG. 21 to FIG. 22 are diagrams illustrating an example of configuring scheduling information of a plurality of frequency blocks in accordance with another embodiment of the present invention. In this embodiment, transport block bundles are allocated regardless of frequency blocks. For convenience, it is assumed that the number of frequency blocks that can be used for transmission and reception within the system band of the wideband system by a specific user equipment is M($\leq$N). In this case, N represents the number of all frequency blocks. M can be established for each user equipment in accordance with transmission and reception capability of the user equipment or decision of the base station. One or a plurality of transport block bundles can be transmitted using different frequency blocks together without discriminating individual frequency block at a certain time. Specifically, the uplink/downlink scheduling information can be defined by two different methods illustrated in FIG. 21 and FIG. 22.

FIG. 21 illustrates that scheduling information is assigned only for a frequency block where actual data transmission and reception is performed at a certain time. Referring to FIG. 21, the scheduling information includes f-block usage information 2110, Trblk information 2120 for transport block bundle, and HARQ information 2130. Also, the scheduling information includes n number of resource allocation (RA) information 2140 indicating resource allocation of each frequency block when the number of frequency blocks allocated at a corresponding time is n. The scheduling information can further include other information (for example, MIMO related information) if necessary. A combination order of information can be determined optionally. Particularly, the f-block usage information 2110 can be defined in a bitmap of N or M bits for N or M number of frequency blocks. In this case, amount of required information can be flexibly modified depending on the number of frequency blocks actually scheduled to the corresponding user equipment at a certain time. Accordingly, it is advantageous in that overhead of scheduling information signaling can be optimized. On the other hand, since the user equipment does not know the number of frequency blocks which will be scheduled thereto, a problem occurs in that formats of scheduling information to be searched by the user equipment increase.

FIG. 22 illustrates that scheduling information is always assigned for N or M number of frequency blocks. Referring to FIG. 22, the scheduling information includes Trblk information 2220, HARQ information 2230, and resource allocation (RA) information 2240 for N or M number of frequency blocks. The scheduling information can further include other information (for example, MIMO related information) if necessary. A combination order of information can be determined optionally. In this case, even though the base station schedules frequency blocks smaller than N or M number of frequency blocks to the user equipment at a random time, since scheduling information transmitted to the user equipment always includes scheduling information of N or M number of frequency blocks, signaling overhead of scheduling information becomes higher. On the other hand, since scheduling information is not varied depending on the number of frequency blocks which are scheduled, it is advantageous in that formats of scheduling information to be searched by the user equipment are reduced.

Figure 23:
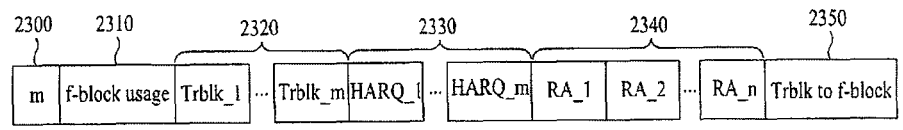
Figure 24:
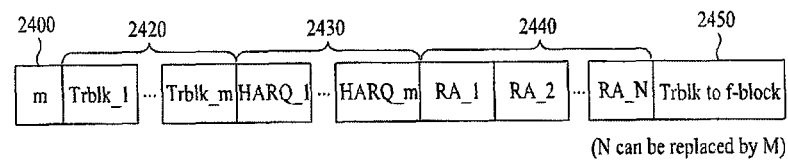

FIG. 23 to FIG. 24 are diagrams illustrating an example of configuring scheduling information of a plurality of frequency blocks in accordance with still another embodiment of the present invention. In this embodiment, frequency blocks are freely mapped with transport block bundles. For convenience, it is assumed that the number of frequency blocks that can be used for transmission and reception within the system band of the wideband system by a specific user equipment is M($\leq$N). In this case, N represents the number of all frequency blocks. M can be established for each user equipment in accordance with transmission and reception capability of the user equipment or decision of the base station. m($1 \leq m \leq n$) number of transport block bundles can be transmitted and received in one user equipment through n number of frequency blocks at a certain time. Specifically, the uplink/downlink scheduling information can be defined by two different methods illustrated in FIG. 23 and FIG. 24.

FIG. 23 illustrates that scheduling information is assigned only for a frequency block where actual data transmission and reception is performed at a certain time. Referring to FIG. 23, the scheduling information includes information (m) 2300 of the number of scheduled transport block bundles, f-block usage information 2310, Trblk information 2320 for m number of transport block bundles, HARQ information 2330, RA information 2340 for n number of frequency blocks, and information (Trblk to f-block) 2350 of mapping m number of transport block bundles with n number of frequency blocks. The scheduling information can further include other information (for example, MIMO related information) if necessary. A combination order of information can be determined optionally. Particularly, the f-block usage information 2310 can be defined in a bitmap of N or M bits for N or M number of frequency blocks. For another example, instead of information (m) 2300 of the number of transport block bundles which are actually transmitted, the number of maximum transport block bundles may be previously set to m'. In this case, Trblk information 2320 and HARQ information 2330 of m', not m, number of transport block bundles may be transmitted. For other example, the user equipment may detect the number of transport block bundles using different scheduling information sizes.

The Trblk to f-block information 2350 can directly indicate one-to-one mapping relation between transport blocks and frequency blocks. For example, frequency blocks where the respective transport blocks are allocated may be indicated using a bit of $\log_2(M)$ or $\log_2(N)$. For another example, the Trblk to f-block information 2350 includes a bitmap of n−1 bits, wherein each bit can indicate a boundary of frequency blocks with which the respective transport block bundles are mapped. For example, it is assumed that two transport block bundles are mapped with four scheduled frequency blocks. In this case, when the Trblk to f-block information 2350 of 3 bits represents 010, the second bit value of 1 ends at a second frequency block of frequency blocks where mapping of the first transport block is scheduled, and starts from a third frequency block of frequency blocks where mapping of the second transport block is scheduled. At this time, bit values 1 and 0 can be defined to be interpreted contrary to each other.

In this case, amount of required information can be flexibly modified depending on the number of frequency blocks actually scheduled to the corresponding user equipment at a certain time. Accordingly, it is advantageous in that overhead of scheduling information signaling can be optimized. On the other hand, since the user equipment does not know the number of frequency blocks which will be scheduled thereto, a problem occurs in that formats of scheduling information to be searched by the user equipment increase.

FIG. 24 illustrates that scheduling information is always assigned for N or M number of frequency blocks. Referring to FIG. 24, the scheduling information includes information (m) 2400 of the number of scheduled transport block bundles, Trblk information 2420 for m number of transport block bundles, HARQ information 2430, M or N number of RA information 2440, and information (Trblk to f-block) 2450 of mapping m number of transport block bundles with n number of frequency blocks. The scheduling information can further include other information (for example, MIMO related information) if necessary. A combination order of information can be determined randomly. For another example, instead of information (m) 2400 of the number of transport block bundles which are actually transmitted, the number of maximum transport block bundles may be previously set to m'. In this case, Trblk information 2420 and HARQ information 2430 of m', not m, number of transport block bundles may be transmitted. For other example, the user equipment may detect the number of transport block bundles using different scheduling information sizes. Details of the Trblk to f-block information 2450 are the same as the description of FIG. 23.

In this case, even though the base station schedules frequency blocks smaller than N or M number of frequency blocks to the user equipment at a certain time, since scheduling information transmitted to the user equipment always includes scheduling information of N or M number of frequency blocks, signaling overhead of scheduling information becomes higher. On the other hand, since scheduling information is not varied depending on the number of frequency blocks which are scheduled, it is advantageous in that formats of scheduling information to be searched by the user equipment are reduced.

Figure 25:
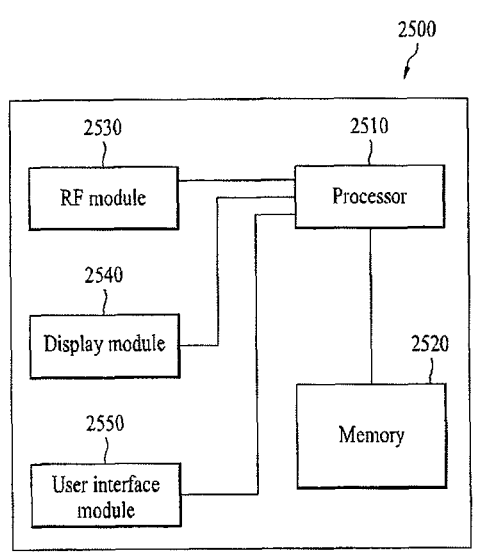
FIG. 25 is a diagram illustrating a transceiver that can be applied to one embodiment of the present invention.

FIG. 25 is a diagram illustrating a transceiver that can be applied to one embodiment of the present invention. The transceiver could be a part of the base station or the user equipment.

Referring to FIG. 25, the transceiver 2500 includes a processor 2510, a memory 2520, an RF module 2530, a display module 2540, and a user interface module 2550. The transceiver 2500 is illustrated for convenience of description, and some modules of the transceiver 2500 may be omitted. Also, the transceiver may further include required modules. Furthermore, some modules of the transceiver 2500 may be divided into segmented modules. The processor 2510 is configured to perform the operation according to the embodiment of the present invention, which is illustrated with reference to the accompanying drawings. In detail, when the transceiver 2500 is a part of the base station, the processor 2510 can generate a control signal and map the control signal with a control channel established within a plurality of frequency blocks. Also, when the transceiver 2500 is a part of the user equipment, the processor 2510 can identify a control channel indicated thereto from a signal received from a plurality of frequency blocks and extract a control signal from the control channel. Afterwards, the processor 2510 can perform a required operation based on the control signal. For the detailed operation of the processor 2510, refer to the description of FIG. 1 to FIG. 24. The memory 2520 is connected with the processor 2510 and stores operating system, application, program code, data, etc. therein. The RF module 2530 is connected with the processor 2510 and converts a baseband signal to a radio signal or vice versa. To this end, the RF module 2530 performs analog conversion, amplification, filtering, frequency unlink conversion or their reverse procedures. The display module 2540 is connected with the processor 2510, and displays various kinds of information. Examples of the display module 2540 include, but not limited to, LCD (Liquid Crystal Display), LED (Light Emitting Diode), and OLED (Organic Light Emitting Diode). The user interface module 2550 is connected with the processor 2510, and can be configured by combination of well known user interfaces such as key pad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention can be applied to a wireless communication system that uses a plurality of frequency blocks. The wireless communication system can support at least one of SC-FDMA (Single Carrier-Frequency Division Multiple Access), MC-FDMA (Multi Carrier-Frequency Division Multiple Access) and OFDMA (Orthogonal Frequency Division Multiple Access). The wireless communication system can support at least one of FDD (Frequency Division Duplex), H-FDD (Half-FDD) and TDD (Time Division Duplex). In detail, the present invention can be applied to a method of signaling control information in the wireless communication system.

What is claimed is:

1. A method of receiving a downlink signal by a user equipment in a wireless communication system, the method comprising:
    receiving downlink scheduling information, wherein the downlink scheduling information includes a frequency block indicator and resource allocation information for one or more transport blocks (TBs); and
    receiving the downlink signal including the one or more TBs via a first frequency block among multiple frequency blocks,
    wherein the first frequency block is indicated by the frequency block indicator among the multiple frequency blocks, and
    wherein each of the multiple frequency blocks does not overlap with other multiple frequency blocks.

2. The method of claim 1, wherein the downlink scheduling information further includes modulation-related information and hybrid automatic repeat request (HARQ)-related information.

3. The method of claim 1, wherein a number of the multiple frequency blocks is less than a number of frequency blocks in a system bandwidth.

4. The method of claim 1, wherein the frequency block indicator includes N−1 bits, and each of the N−1 bits represent a boundary between two neighboring frequency blocks in the multiple frequency blocks, where N is a number of the multiple frequency blocks.

5. The method of claim 1, Wherein each of the multiple frequency blocks has a respective hybrid automatic repeat request (HARQ) process.

6. A method of transmitting a downlink signal by a base station in a wireless communication system, the method comprising:
    transmitting downlink scheduling information, wherein the downlink scheduling information includes a frequency block indicator and resource allocation information for one or more transport blocks (TBs); and
    transmitting the downlink signal including the one or more TBs via a first frequency block among multiple frequency blocks,
    wherein the first frequency block is indicated by the frequency block indicator among the multiple frequency blocks, and
    wherein each of the multiple frequency blocks does not overlap with other multiple frequency blocks.

7. The method of claim 6, wherein the downlink scheduling information further includes modulation-related information and hybrid automatic repeat request (HARQ)-related information.

8. The method of claim 6, wherein a number of the multiple frequency blocks is less than a number of frequency blocks in a system bandwidth.

9. The method of claim 6, wherein the frequency block indicator includes N−1 bits, and each of the N−1 bits represent a boundary between two neighboring frequency blocks in the multiple frequency blocks, where N is a number of the multiple frequency blocks.

10. The method of claim 6, wherein each of the multiple frequency blocks has a respective hybrid automatic repeat request (HARQ) process.

11. A user equipment for use in a wireless communication system, the user equipment comprising:
a radio frequency unit; and
a processor configured to:
receive downlink scheduling information, wherein the downlink scheduling information includes a frequency block indicator and resource allocation information for one or more transport blocks (TBs), and
receive a downlink signal including the one or more TBs via a first frequency block among multiple frequency blocks,
wherein the first frequency block is indicated by the frequency block indicator among the multiple frequency blocks, and
wherein each of the multiple frequency blocks does not overlap with other multiple frequency blocks.

12. The user equipment of claim 11, wherein the downlink scheduling information further includes modulation-related information and hybrid automatic repeat request (HARQ)-related information.

13. The user equipment of claim 11, wherein a number of the multiple frequency blocks is less than a number of frequency blocks in a system bandwidth.

14. The user equipment of claim 11, wherein the frequency block indicator includes N−1 bits, and each of the N−1 bits represent a boundary between two neighboring frequency blocks in the multiple frequency blocks, where N is a number of the multiple frequency blocks.

15. The user equipment of claim 11, wherein each of the multiple frequency blocks has a respective hybrid automatic repeat request (HARQ) process.

16. A base station for use in a wireless communication system, the base station comprising:
a radio frequency unit; and
a processor configured to:
transmit downlink scheduling information, wherein the downlink scheduling information includes a frequency block indicator and resource allocation information for one or more transport blocks (TBs), and
transmit a downlink signal including the one or more TBs via a first frequency block among multiple frequency blocks,
wherein the first frequency block is indicated by the frequency block indicator among the multiple frequency blocks, and
wherein each of the multiple frequency blocks does not overlap with other multiple frequency blocks.

17. The base station of claim 16, wherein the downlink scheduling information further includes modulation-related information and hybrid automatic repeat request (HARQ)-related information.

18. The base station of claim 16, wherein a number of the multiple frequency blocks is less than a number of frequency blocks in a system bandwidth.

19. The base station of claim 16, wherein the frequency block indicator includes N−1 bits, and each of the N−1 bits represent a boundary between two neighboring frequency blocks in the multiple frequency blocks, where N is a number of the multiple frequency blocks.

20. The base station of claim 16, wherein each of the multiple frequency blocks has a respective hybrid automatic repeat request (HARQ) process.

* * * * *